(12) United States Patent

Fitch et al.

(10) Patent No.: US 12,674,697 B2

(45) Date of Patent: Jul. 7, 2026

(54) MACHINE FLUID CONDITION MONITORING SYSTEM

(71) Applicant: Luneta, LLC, Tulsa, OK (US)

(72) Inventors: James Chester Fitch, Tulsa, OK (US); Thomas Chester Fitch, Tulsa, OK (US); James Bennett Fitch, Tulsa, OK (US); Jeremy J. Wright, Glenpool, OK (US)

(73) Assignee: Luneta, LLC, Tulsa, OK (US)

( * ) Notice: Subject to any disclaimer, the term of this patent is extended or adjusted under 35 U.S.C. 154(b) by 0 days.

(21) Appl. No.: 18/064,120

(22) Filed: Dec. 9, 2022

(65) Prior Publication Data

US 2023/0228609 A1     Jul. 20, 2023

Related U.S. Application Data

(60) Continuation of application No. 16/663,865, filed on Oct. 25, 2019, now Pat. No. 11,525,724, which is a division of application No. 15/134,219, filed on Apr. 20, 2016, now Pat. No. 10,545,045.

(60) Provisional application No. 62/150,089, filed on Apr. 20, 2015.

(51) Int. Cl.
| | |
|---|---|
| *G01F 23/02* | (2006.01) |
| *F16K 1/04* | (2006.01) |
| *F16K 37/00* | (2006.01) |

(52) U.S. Cl.
CPC ................ *G01F 23/02* (2013.01); *F16K 1/04* (2013.01); *F16K 37/0058* (2013.01)

(58) Field of Classification Search
CPC ...................................................... G01F 23/02

USPC ..................................................... 73/426, 428
See application file for complete search history.

(56) References Cited

U.S. PATENT DOCUMENTS

| | | | | |
|---|---|---|---|---|
| 1,446,056 | A | * | 2/1923 | Misener ............. F01M 11/0408 |
| | | | | 184/6 |
| 1,492,883 | A | * | 5/1924 | Kidder .................. F16K 5/0207 |
| | | | | 251/297 |
| 1,983,660 | A | * | 12/1934 | Fish ......................... F02M 7/11 |
| | | | | 261/72.1 |
| 2,672,879 | A | * | 3/1954 | Downin ................ F16K 31/602 |
| | | | | 137/382 |
| 2,969,081 | A | * | 1/1961 | Pipes ........................ F16T 1/14 |
| | | | | 137/493 |
| 3,006,360 | A | * | 10/1961 | Oxenham ............... F17C 13/06 |
| | | | | 222/4 |
| 3,776,412 | A | * | 12/1973 | Mink ...................... F17C 13/06 |
| | | | | 220/726 |
| 4,316,481 | A | | 2/1982 | Fillman |
| 4,332,331 | A | * | 6/1982 | Fawley ................. F17C 13/002 |
| | | | | 220/726 |

(Continued)

OTHER PUBLICATIONS

Dated Prior to Apr. 20, 2015—"Oil Sight Glasses", Advanced Fluid Technologies, http://wi w.aftgrp.com/oil-sight-glasses.html.

*Primary Examiner* — John Fitzgerald

(74) *Attorney, Agent, or Firm* — DUNLAP CODDING, P.C.

(57)     ABSTRACT

A sight glass column is described. The sight glass column is configured to be indirectly attachable to a machine via a machine connector such that machine fluid is transferable from the machine to the sight glass column. The sight glass column further has a remote sensing port, and a lockable oil level ring.

14 Claims, 11 Drawing Sheets

(56)  References Cited

U.S. PATENT DOCUMENTS

| | | | | | |
|---|---|---|---|---|---|
| 4,549,568 | A | * | 10/1985 | Trail | F17C 13/003 |
| | | | | | 40/306 |
| 4,704,983 | A | * | 11/1987 | Rung | G01F 23/02 |
| | | | | | 116/276 |
| 4,855,041 | A | * | 8/1989 | Church | B01D 36/001 |
| | | | | | 137/203 |
| 4,955,391 | A | * | 9/1990 | Parker | A61B 5/208 |
| | | | | | 600/584 |
| 5,075,905 | A | * | 12/1991 | Rutherford | E03C 1/284 |
| | | | | | 4/256.1 |
| D334,967 | S | * | 4/1993 | Kitsuda | D23/206 |
| 5,323,654 | A | * | 6/1994 | Newman | G01F 23/02 |
| | | | | | 73/330 |
| 6,083,381 | A | * | 7/2000 | Connelly | F02M 37/28 |
| | | | | | 251/304 |
| 7,178,546 | B2 | * | 2/2007 | Gremillion, III | F16K 35/10 |
| | | | | | 137/15.01 |
| 8,294,054 | B2 | * | 10/2012 | Chiu | F24F 13/222 |
| | | | | | 200/573 |
| 8,528,586 | B2 | * | 9/2013 | Cannet | F17C 13/04 |
| | | | | | 220/726 |
| 9,016,480 | B2 | * | 4/2015 | Tandon | B04C 5/28 |
| | | | | | 209/729 |
| 9,417,161 | B2 | * | 8/2016 | Aljohani | G01F 23/02 |
| 10,253,284 | B2 | * | 4/2019 | Blichmann | C12C 13/10 |
| 10,451,466 | B2 | * | 10/2019 | Cooper | G01F 23/02 |
| 10,539,054 | B2 | * | 1/2020 | Fitch | F01M 11/10 |
| 11,525,725 | B2 | * | 12/2022 | Fitch | G01F 23/02 |
| 2005/0007253 | A1 | * | 1/2005 | Denietolis | G01F 23/606 |
| | | | | | 340/619 |
| 2006/0070662 | A1 | * | 4/2006 | Gremillion | F16K 27/12 |
| | | | | | 137/382 |
| 2010/0213118 | A1 | * | 8/2010 | Tandon | B04C 5/12 |
| | | | | | 210/512.2 |
| 2011/0206548 | A1 | | 8/2011 | Doepker | |
| 2012/0132839 | A1 | | 5/2012 | Moren | |
| 2014/0238156 | A1 | * | 8/2014 | Aljohani | G01N 1/10 |
| | | | | | 73/864.63 |
| 2014/0336634 | A1 | | 11/2014 | Gomez | |
| 2016/0305295 | A1 | * | 10/2016 | Fitch | F01M 11/10 |
| 2018/0209664 | A1 | * | 7/2018 | Heath | F24D 3/1058 |
| 2023/0241534 | A1 | * | 8/2023 | Mason | B01D 29/114 |
| | | | | | 210/90 |
| 2024/0181471 | A1 | * | 6/2024 | Tandon | B04C 5/28 |

* cited by examiner

MACHINE FLUID CONDITION MONITORING SYSTEM

INCORPORATION BY REFERENCE

The present application is a continuation of U.S. patent application Ser. No. 16/663,865, filed Oct. 25, 2019, which is a divisional of U.S. patent application Ser. No. 15/134,219 filed Apr. 20, 2016, which claims priority of the provisional patent application filed on Apr. 20, 2015 and identified by U.S. Ser. No. 62/150,089. The entire contents of the patent applications referenced above are hereby incorporated by reference herein in their entireties.

FIELD OF THE DISCLOSURE

The disclosure generally relates to methods and apparatuses for monitoring machine fluids, such as lubricants in machinery. More particularly, but not by way of limitation, the disclosure relates to apparatuses adapted for easy access, testing, and monitoring of machine fluids in a fluid reservoir such as a machine fluid storage container, or within machinery, such as, but not limited to, oil within manufacturing equipment.

BACKGROUND

Most machines used in manufacturing and other industries require machine fluids for lubrication and function of machine components. Exemplary machine fluids include lubricants and oils which may be based upon hydrocarbon, synthetic and/or petroleum based products. Other types of machine fluids include hydraulic fluids. The machine fluids typically must be maintained within a preferred range of composition and cleanliness for efficient performance of the machine. For example, when oil is used as a machine fluid, the unwanted addition of water or debris may cause the machine to loose efficiency or sustain damage.

Typically, machine fluids are monitored through the collection and analysis of samples of the machine fluid. However, some current sampling and monitoring processes are inefficient, time consuming, and costly. For example, sampling may be taken from the bottom of the sump of machines (e.g., from drain ports), which can mix the lubricant with sediment making effective oil monitoring difficult. A sample port, a bottom sediment and water bowl, a sight glass column (collectively referred to herein as machine fluid equipment) can be connected to the drain port and used for various purposes. One or more T-pipe connectors may be used to connect multiples of the machine fluid equipment to the drain port. However, various problems exist with respect to conventional machine fluid equipment, and the manner in which it is used.

For example, T-pipe connectors space the machine fluid equipment away from the drain port and the machine increasing the likelihood that the machine fluid equipment will take up costly space within a facility and/or will be unintentionally impacted and damaged. The use of multiple T-pipe connectors also makes it difficult for fluid to flow easily between the sight glasses and the machine. Consequently, sight glasses attached using multiple T-pipe connectors end up showing stagnant machine fluid rather than the actual fluid interfacing the critical components of the machine.

Sight glass columns made of glass or plastic that is transparent to visible light are used for oil level measurements. Oil level rings have been placed on the sight glass columns to mark upper and lower limits for oil level. Conventional oil level rings, however, are easy to tamper with or can be unintentionally moved by gravity or vibration, thus resulting in errors in managing oil level and the potential for machine failure. Sight glass columns are typically cylindrical in shape. The cylindrical shape of the sight glass column distorts light passing through the sight glass column which reduces the clarity at which the machine fluid can be observed.

The bottom sediment and water bowls typically have a flat bottom with a drain port to receive a drain valve. In some versions, the conventional bottom sediment and water bowls have a magnet at the bottom which is used to determine if any particles of ferrous material are located within the machine fluid. In practice, the flat bottoms of the conventional bottom sediment and water bowls developed a layer of sludge at the bottom, which is difficult to remove. Further, the layer of sludge can cover the magnet thereby obscuring any ferrous material that the magnet has been able to capture.

In light of the foregoing, there is a need in the art for improvements in machine fluid equipment to enhance the ability of users to monitor the condition of the machine fluid. It is to such improved machine fluid equipment that the presently disclosed inventive concepts are directed.

SUMMARY

Apparatuses are disclosed that facilitate efficient monitoring and/or sampling of a machine fluid within a machine or fluid reservoir such as a machine fluid storage container. The problem of inefficient coupling of multiple machine fluid equipment is addressed by a hub having a fitting, such as a reducer that is inset into a body having multiple ports. The problems with respect to conventional sight glasses distorting the light are addressed by a sight glass having a remote sensing port. The remote sensing port may have a substantially flat inner and/or outer surface that may be spaced a uniform distance apart. The remote sensing port may be composed of material and be of a shape suitable for a laser to pass through, with minimal distortion and reflection. The problems associated with the conventional oil level rings is addressed by an oil level ring that is provided with a band and a locking device to permit the oil level ring to be placed at a desired location on the site glass column and then to securely lock the oil level ring in position. The problems associated with the conventional bottom sediment and water bowls is addressed with a bottom sediment and water bowl having a tapered bottom and an indicator, such as a magnet, suspended above the tapered bottom so as to prevent any interference with sludge accumulating at the bottom of the bottom sediment and water bowl.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

The following detailed description refers to the accompanying drawings. The same reference numbers in different drawings may identify the same or similar elements.

The mechanisms proposed in this disclosure circumvent the problems described above. The present disclosure describes an exemplary machine fluid condition monitoring system for monitoring and/or sampling a machine fluid using a sight glass at least partially constructed of a material that is transparent to light within a visible region.

In one embodiment, a sight glass at least partially constructed of a material that is transparent to light within a visible region has one or more remote sensing ports constructed of a material that is transparent to light within a visible region.

DESCRIPTION

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise.

Further, use of the term "plurality" is meant to convey "more than one" unless expressly stated to the contrary.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As discussed above, current systems for monitoring and sampling machine lubricants are inefficient, costly, and time consuming. The present disclosure addresses these deficiencies, in one embodiment, with an apparatus for monitoring and sampling machine liquids comprising a sight glass assembly having a sight glass at least partially constructed of transparent material and having one or more ports for multiple monitoring functions.

Figure 1:
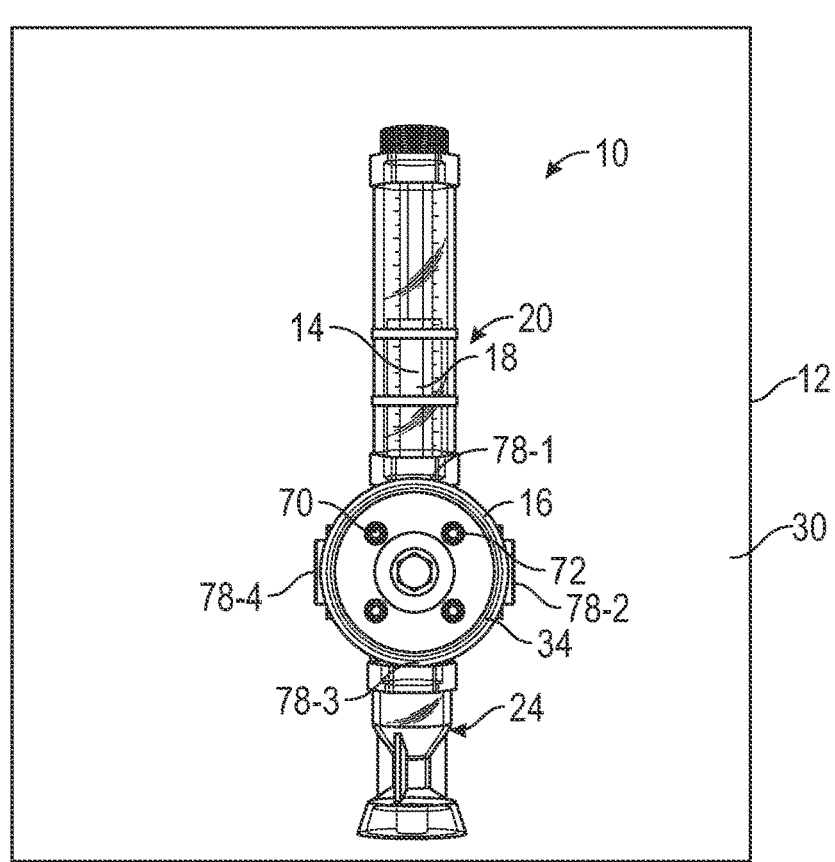
FIG. 1 is a front elevational view of an exemplary machine fluid condition monitoring system constructed in accordance with the present disclosure and configured to be mounted to a port of a machine having machine fluid to be monitored such that a machine fluid within the machine enters into the machine fluid condition monitoring system and is visible to a person monitoring the condition of the machine fluid.
Figure 2:
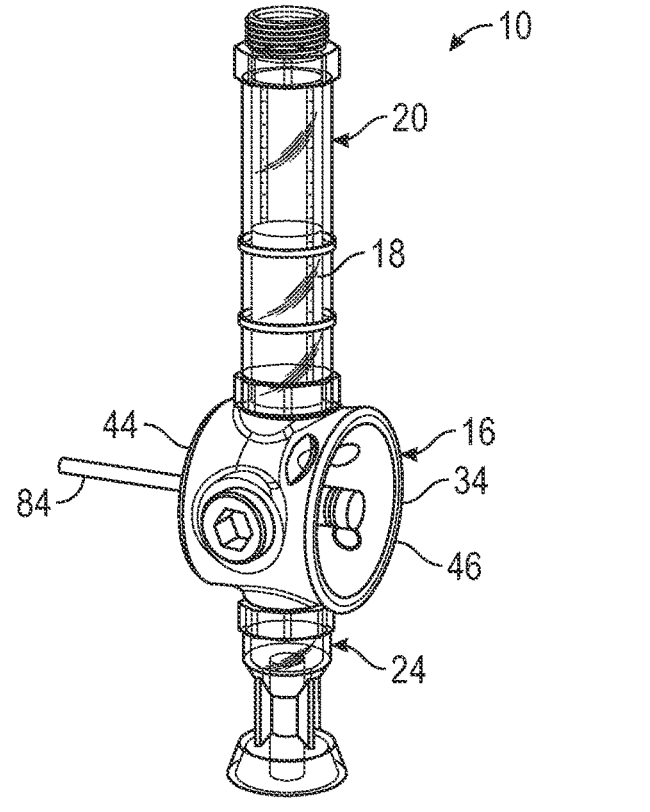
FIG. 2 is a side perspective view of the exemplary machine fluid condition monitoring system depicted in FIG. 1 and constructed in accordance with the present disclosure.

Referring now to the drawings, and in particular to FIGS. 1 and 2, shown therein is an exemplary machine fluid condition monitoring system 10 constructed in accordance with the present disclosure and mounted to a port (not shown) of a machine 12 having machine fluid 14 to be monitored such that the machine fluid 14 within the machine 12 enters into the machine fluid condition monitoring system 10 and is visible to a person monitoring the condition of the machine fluid 14. In general, the machine fluid condition monitoring system 10 includes a hub 16, a sight glass 20, and a bottom sediment and water bowl 24. The sight glass 20 is connected to and supported by the hub 16 and extends away from the hub 16, generally in an upward direction. Although the machine fluid condition monitoring system 10 will be described herein in conjunction with the machine 12, it should be understood that the machine fluid condition monitoring system 10 can be used with any fluid reservoir, such as a machine fluid storage container. As will be discussed in more detail below, the sight glass 20 may be provided with a remote sensing port 18 to enhance the readability of the sight glass 20 as compared to conventional cylindrical sight glasses. In some embodiments, the machine 12 or fluid reservoir may include a housing 30 with a port sized, dimensioned, and located to either overlap with, or be beneath a level, e.g., a predetermined preferred level, of the machine fluid 14 within the housing 30. For example, the port within the housing 30 of the machine 12 may be a drain port. The port is not limited to the drain port, but can be any port on a machine or reservoir that could benefit from having multiple ports. The hub 16 may be connected to the housing 30 of the machine 12 so as to provide fluid communication between the drain port and the sight glass 20 and the bottom sediment and water bowl 24, as will be discussed in more detail below. The bottom sediment and water bowl 24 is connected to and supported by the hub 16 and extends away from the hub 16 generally in a downwardly direction.

Figure 3A:
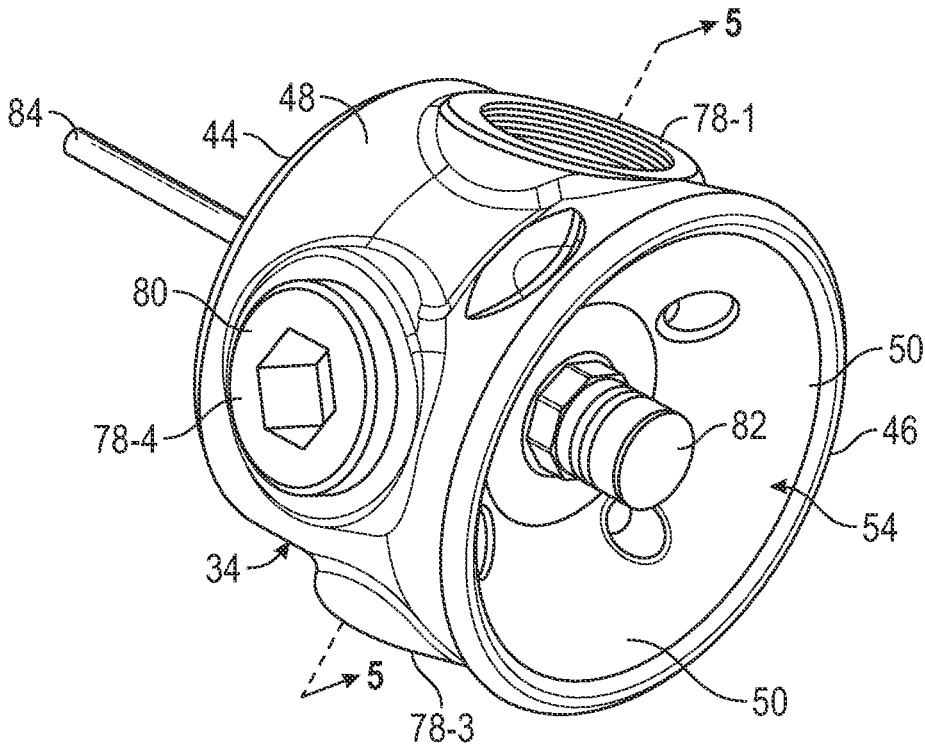
FIG. 3A is a front perspective view of an exemplary hub constructed in accordance with the present disclosure of the machine fluid condition monitoring system.
Figure 3B:
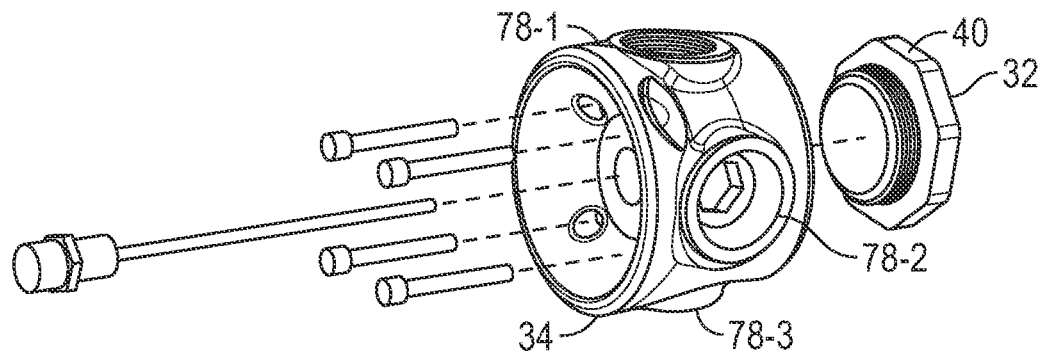
FIG. 3B is a front, exploded, perspective view of the exemplary hub.
Figure 4:
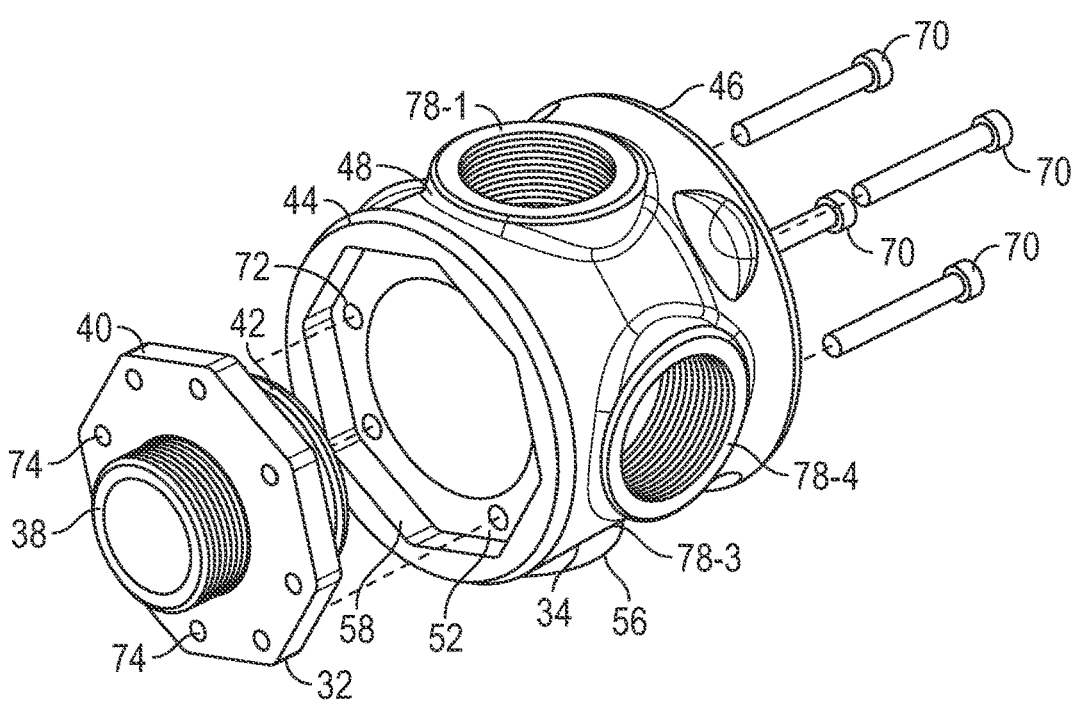
FIG. 4 is a rear, exploded, perspective view of the exemplary hub depicted in FIG. 3A.

FIG. 3A is a front perspective view of the exemplary hub 16 constructed in accordance with the present disclosure of the machine fluid condition monitoring system 10. In general, the hub 16 includes a fitting 32, and a body 34. The fitting 32 is configured to be connected to the housing 30 of the machine 12 so as to provide fluid communication through the port of the machine 12. As shown in FIG. 4, the fitting 32 may be provided with a first tubular projection 38, a flange 40, and a second tubular projection 42. The flange 40 may be positioned between the first tubular projection 38 and the second tubular projection 42 and serves to stabilize the body 34 when the body 34 is connected to the fitting 32, as well as to provide a mechanism for connecting the body 34 to the fitting. As will be described below, the flange 40 can be provided with polygonal shape, e.g., a hex shape, and used to tighten the fitting onto the machine 12 using a wrench, for example. The first tubular projection 38 is configured to be connected to the port of the machine 12. Once the first tubular projection 38 is connected to the port of the machine 12, then the body 34 may be placed on the second tubular projection 42 and then secured to the flange 40 as discussed in more detail below.

As shown in FIG. 4, the first tubular projection 38 may be provided with external threads that are adapted to mate with internal threads provided on the port of the machine 12. As will be understood by one skilled in the art, the port of the machine 12 may be provided with various sizes and/or threading configurations and therefore the first tubular projection 38 may also be provided in various sizes with multiple thread options so as to matingly engage with internal threads on the port.

Figure 5:
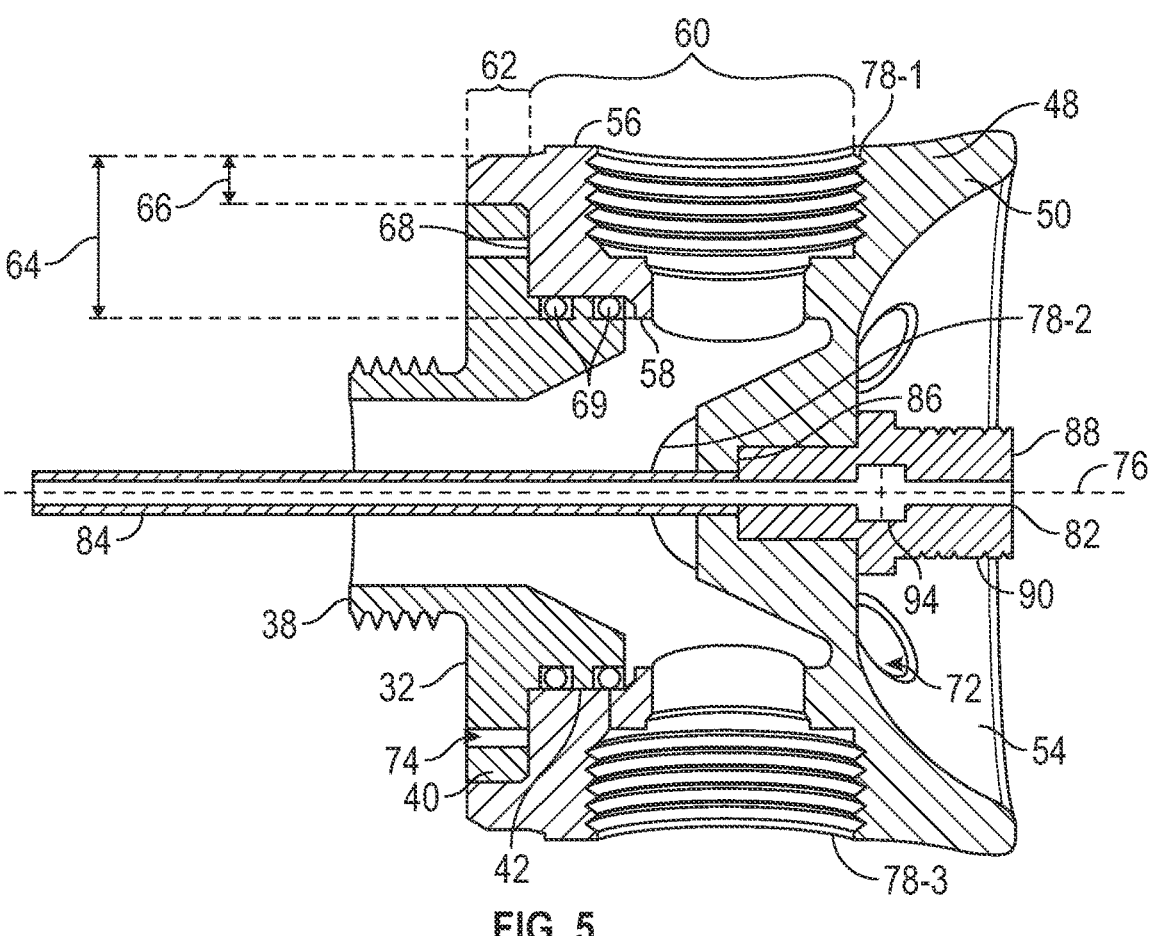
FIG. 5 is a cross-sectional view of a body of the hub depicted in FIG. 3A taken along lines 5-5 thereof, and a side elevational view of a sample port assembly of the hub depicted in FIG. 3A.

The body 34 is provided with a first end 44, second end 46, an outer wall 48 extending between the first end 44 and the second end 46, and a medial wall 50 positioned between the first end 44 and the second end 46. The medial wall 50 extends inwardly from the outer wall 48 such that the outer wall 48 and the medial wall 50 define a first cavity 52 adjacent to the first end 44, and a second cavity 54 adjacent to the second end 46. The outer wall 48 is provided with an outer surface 56 and an inner surface 58. As best shown in FIG. 5, the outer wall 48 is also provided with a lateral port section 60, and a receiver section 62. The lateral port section 60 is positioned in between the receiver section 62 and the medial wall 50. The lateral port section 60 and the receiver section 62 may be tubular in configuration so as to surround and provide boundaries of the first cavity 52 within the body 34. Further, the lateral port section 60 may be provided with a first thickness 64, and the receiver section 62 may be provided with a second thickness 66 which is less than the first thickness 64. The lateral port section 60 may be provided with a shoulder 68 extending inwardly with respect to the receiver section 62 and located at an intersection of the receiver section 62 and the lateral port section 60.

The receiver section 62 may be shaped to matingly receive the flange 40 of the fitting 32 into the first cavity 52 until the flange 40 contacts the shoulder 68, and the lateral port section 60 may be shaped to matingly receive the second tubular projection 42 of the fitting 32 into the first cavity 52. As shown in FIG. 5, the fitting 32 is nested/concealed within the body 34 of the hub 16. This allows for a smaller/shorter overall length of the hub 16 without compromising function or installation and also creates a more seamless appearance. So as to prevent leakage of machine fluids 14, one or more O-rings 69 may be provided within the lateral port section 60 generally adjacent to the shoulder 68 so as to engage and form a fluid tight seal with the second tubular projection 42. In one embodiment, the second tubular projection 42 may be provided with a smooth, cylindrically shaped outer surface.

In one embodiment, the flange 40 of the fitting 32 may be shaped so as to be received into the receiver section 62 in more than one position so as to permit adjustment of a position of the body 34 relative to the fitting 32 in a controlled and secured manner. For example, the flange 40 may be constructed with an octagonal shape so that the flange 40 can be positioned within the receiver section 62 in 8 distinct positions with each position being angularly located 45° apart. In other embodiments, the flange 40 may be provided with other shapes, so as to be positionable within the receiver section 62 at more than 8 angular positions or less than 8 angular positions. For example, the flange 40 may be provided with any shape to accommodate any type of wrench, such as a fixed wrench, an adjustable wrench, or a spanner wrench so that the wrench can be used to tighten the fitting 32 onto the machine 12. In one embodiment, the flange 40 is shaped in the form of a hexagon or a decagon.

Once positioned within the receiver section 62, the fitting 32 may be secured within the body 34 in a variety of manners. For example, in accordance with the present disclosure the hub 16 is provided with a plurality of bolts 70 and the body 34 is provided with a plurality of holes 72 extending through the medial wall 50 for receiving the bolts 70 and permitting the bolts 70 to engage the flange 40. For purposes of clarity, only one of the bolts 70 and the holes 72 has been labeled in FIG. 1. The plurality of holes 72 may be formed in a first pattern, and the flange 40 may be provided with a series of holes 74 in a second pattern. In the example shown, the flange is provided with eight holes 74, but only two of the holes 74 have been labeled for purposes of clarity. The first pattern and the second pattern may be related such that holes 72 within the first pattern are aligned with certain ones of the holes 74 in the second pattern at each of the positions in which the flange 40 can be disposed within the receiver section 62.

As shown in FIG. 5, the body 34 is also provided with a longitudinal axis 76. The lateral port section 60 of the body 34 is provided with a plurality of ports 78 extending from the inner surface 58 to the outer surface 56. In the example shown, the ports 78 are labeled as 78-1, 78-2, 78-3, and 78-4 for purposes of clarity. In one embodiment, each of the ports 78 is located equidistant from the longitudinal axis 76, and spaced apart angularly from each other an angular equidistant amount. In the example shown, the port 78-1 is located at 0°, the port 78-2 is located at 90°, the port 78-3 is located at 180°, and the port 78-4 is located at 270°. Although the example has the lateral port section 60 provided with 4 ports 78-1, 78-2, 78-3, and 78-4 spaced apart at 90°, it should be understood that the lateral port section 60 could be provided with more or less than 4 ports 78-1, 78-2, 78-3, and 78-4 and that such ports 78-1, 78-2, 78-3, and 78-4 may or may not be angularly equidistant.

The ports 78 can be used to connect static machine fluid equipment, such as the sight glass 20 and the bottom sediment and water bowl 24 to the body 34. Other types of static and dynamic machine fluid equipment including sensors, lights, quick connects, sight glasses, filter carts, particle counters, condition monitoring equipment and the like can also be connected to the ports 78. For example, a dynamic device, e.g., a pump can pull machine fluid 14 from one of the ports 78, and then return the machine fluid 14 to another one of the ports 78. The first cavity 52 and the ports 78 serve to establish fluid communication from the port of the machine 12 to the machine fluid equipment. In the example depicted in FIG. 1, the sight glass 20 is connected to the port 78-1, and the bottom sediment and water bowl 24 is connected to the port 78-3.

The ports 78 can be designed to connect to the machine fluid equipment using any suitable connection methodology. For example, the ports 78 can be threaded, or can be provided with quick connect structure, or the like. The hub 16 can be provided with one or more plugs 80 to seal any unused ports 78. For example, a plug 80 is shown in FIG. 3A sealing the port 78-4.

The hub 16 may also be provided with one or more sample port assembly 82, and one or more pilot tube 84 connected to the sample port assembly 82. In the example shown, the hub 16 is provided with one sample port assembly 82 extending through the medial wall 50 and positioned coaxially on the longitudinal axis 76. The outer wall 48 serves as a shield to protect sensitive equipment/hardware/fittings, e.g., the sample port assembly 82 from impacts without inhibiting access. In some embodiments, the second cavity 54 is large enough so that a hand can be used to access the sample port assembly 82. The pilot tube 84 extends from the sample port assembly 82 along the longitudinal axis 76 beyond the first end 44 of the body 34. The sample port assembly 82 may have a first end 86 and a second end 88, an inside surface (not shown) and an outside surface 90 from the first end 86 to the second end 88 forming a sealable access pathway whereby one or more samples of the machine fluid 14 are accessible. In one embodiment, the sample port assembly 82 may include a valve 94 to aid the user in drawing the machine fluid 14 out of the machine 12 through the pilot tube 84 and the sample port assembly 82.

The sample port assembly 82 may be utilized to pull a sample of the machine fluid 14 from the machine 12 from a preferred location in the machine 12. For example, the pilot tube 84 may be connected to the first end 86 of the sample port assembly 82. The pilot tube 84 may be a tube of sufficient length and shape to obtain machine fluid 14 from a preferred location in the machine 12 to the sample port assembly 82. The pilot tube 84 may be constructed of a bendable material so that the installer may bend the pilot tube 84 to place the inlet of the pilot tube 84 at a desired location, and preferably away from any sludge. The preferred location may be near active flow of the machine fluid 14 so as to access a sample reflective of actual conditions within the machine 12. The sample of machine fluid 14 may be analyzed for composition, cleanliness, moisture content, and so on, to determine if the machine fluid 14 and/or the machine 12 are in a preferred range for efficiency.

As shown in FIG. 5, the sample port assembly 82 may be at least 75% recessed within the body 34. For example, the medial wall 50 may have a concave (or other) shape adjacent to the second end 46. In this example, the sample port assembly 82 is attached to a section of the medial wall 50 that is spaced a distance from the second end 46 so that the sample port assembly 82 is recessed within the body 34.

Thus, the outer wall 48 acts as a shield to assist in protecting the sample port assembly 82 from inadvertent damage.

As one skilled in the art will understand, the body 34 can be made of aluminum or other material so as to provide structural support for the machine fluid equipment that may be attached to the ports 78. The body 34 can also be constructed of a transparent material, that is capable of providing structural support and is also capable of passing visible light so that a user can see the machine fluid 14 through the body 34. In other embodiments, the body 34 can be made of multiple types of material so as to provide additional functionality to the body 34. For example, the body 34 can be constructed of a frame constructed of an opaque material such as aluminum but having the medial wall 50 constructed of a transparent material so that a user can see the machine fluid 14 through the medial wall 50. In one embodiment, the outer wall 48 may be provided with a cylindrical shape.

Figure 6A:
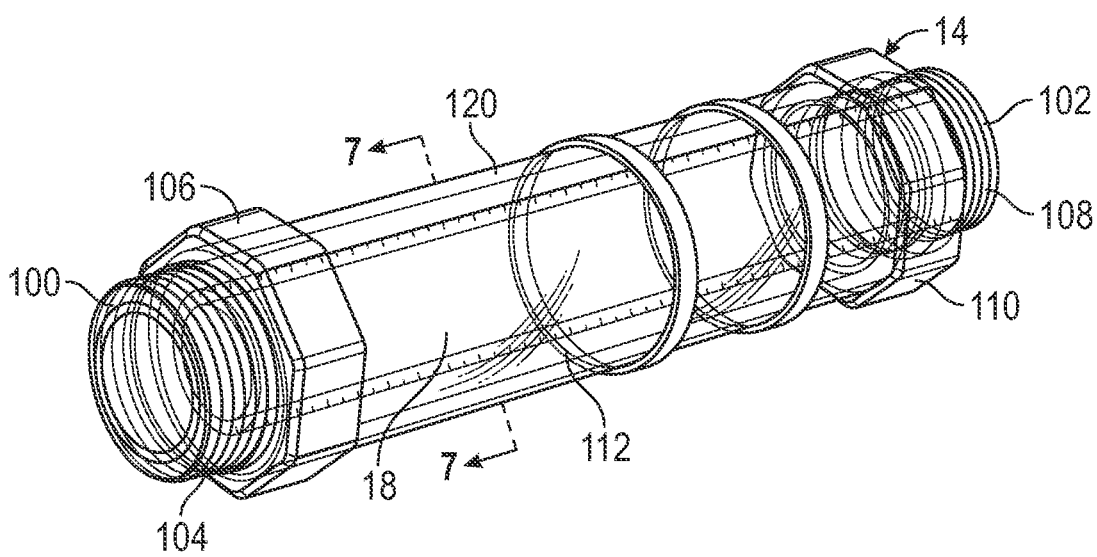
FIG. 6A is a side perspective view of a sight glass in accordance with the present disclosure.
Figure 6B:
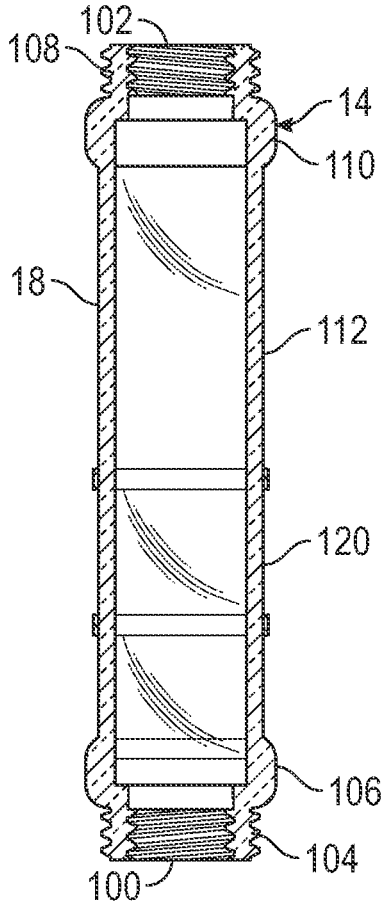
FIG. 6B is a front elevation view of the sight glass of FIG. 6A.
Figure 7:
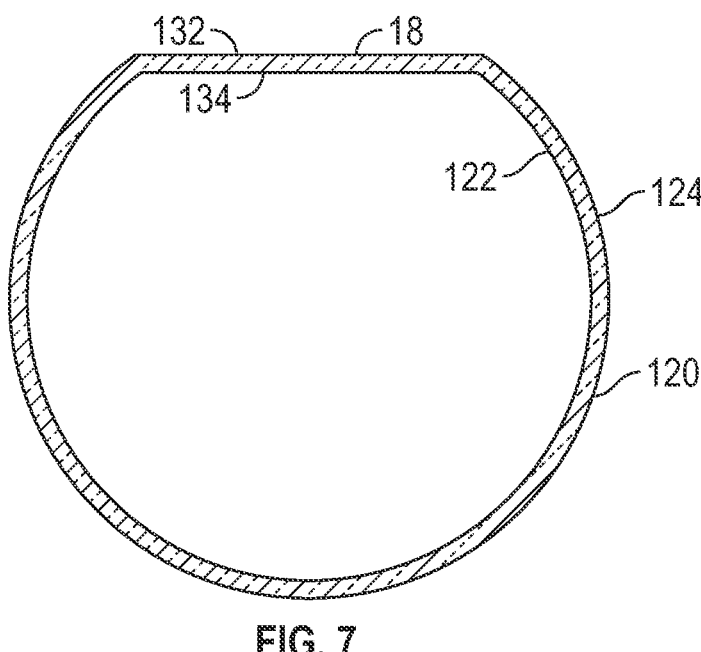
FIG. 7 is a cross-sectional view of the sight glass taken along line 7-7 in FIG. 6A.

FIG. 6A is a side perspective view of the sight glass 20 in accordance with the present disclosure. FIG. 6B is a front elevation view of the sight glass 20 of FIG. 6A and FIG. 7 is a cross-sectional view of the sight glass 20 taken along line 7-7 in FIG. 6A. The sight glass 20 may be provided with a first end 100, and a second end 102 which are both open and provide access to a cavity surrounded by the sight glass 20. The sight glass 20 may also be provided with a first connector 104 extending from the first end 100 towards the second end 102, and a first raised portion 106 positioned adjacent to the first connector 104. The sight glass 20 may also be provided with a second connector 108 extending from the second end 102 towards the first end 100, and a second raised portion 110 positioned adjacent to the second connector 108. The first connector 104 and the second connector 108 may be provided with any configuration to be indirectly attachable to the machine 12 via a machine connector, such as the hub 16. In one embodiment, the first connector and the second connector 104 and 108 are configured to connect to one of the ports 78 of the body 34. For example, the first connector 104 and the second connector 108 may be externally threaded so as to matingly engage with internal threads of the ports 78. In another embodiment, the first connector 104 and the second connector 108 may be configured as male parts of a quick connect assembly. The first raised portion 106 and the second raised portion 110 are configured to facilitate installation of the sight glass 20 onto the ports 78 or other suitable device. In one embodiment, the first raised portion 106 and the second raised portion 110 may be configured as a hex nut to receive a wrench and facilitate installation of the sight glass 20.

The sight glass 20 can be constructed of a high impact, chemically resistant and crystal-clear material that can pass visible light, such as acrylic or glass. In one embodiment, the sight glass 20 is integrally formed as a unitary structure using a molding process and in this instance, the first connector 104, the second connector 108, the first raised portion 106 and the second raised portion 110 may be molded features of the sight glass 20. The sight glass 20 may have a length extending between the first end 100 and the second end 102. The length can be provided in a variety of sizes such as 3", 6", 9", 12" and 18".

The sight glass 20 may also be provided with a viewing portion 112 which may be located between the first raised portion 106 and the second raised portion 110. The sight glass 20 may have a sidewall 120 extending within the viewing portion 112 and between the first end 100 and the second end 102. The sight glass 20 may also be provided with a plurality of level rings 121a and 121b positioned on and surrounding the sidewall 120. The level rings 121*a* and
121*b* may also intersect the viewing portion 112 so as to
represent a maximum level and a minimum level of the
machine fluid 14 within the machine 12. The level rings
121*a* and 121*b* may be sized and constructed to matingly and
to grippingly engage the sidewall 120 so as to permit a user
to selectively place and maintain the level rings 121*a* and
121*b* at desired locations on the sidewall 120. The level rings
121*a* and 121*b* can be constructed of any material that is
capable of matingly and grippingly engage in the sidewall
120. For example the level rings can be made of any flexible
material, (with or without elastomeric properties) such as a
polymer or a metal. Further, in some embodiments, the level
rings 121*a* and 121*b* can be constructed so as to be highly
visible to the user. For example, the level rings 121*a* and
121*b* can be provided with various colors such as red and
green. In addition, the level ring 121*a* can be colored
differently than the level ring 121*b*. The sidewall 120 may
have a tubular shape and have an inner surface 122 and an
outer surface 124 and may also have at least one remote
sensing port 18 positioned on the sidewall 120 and extend-
ing between the inner surface 122 and the outer surface 124
between the first raised portion 106 and the second raised
portion 110. In the embodiment illustrated in FIGS. 6A, 6B
and 7, the sight glass 20 has one remote sensing port 18,
however, it should be understood that more than one remote
sensing port 18 can be provided. Of course, it will be
understood that the sight glass 20 may have more than one
remote sensing port 18, and that the remote sensing port(s)
18 may be located in different positions in the sight glass 20.

The sidewall 120 may have a cylindrical cross-section
outside of the remote sensing port 18 as shown in FIG. 7.
The remote sensing port 18 may have a substantially flat
outer face 132 on the outer surface 124 and/or a substantially
flat inner face 134 on the inner surface 122 of the sight glass
20. In one embodiment, the flat outer face 132 is a secant of
the outer surface 124 of the sight glass 20, and the flat inner
face 134 is a secant of the inner surface 122 of the sight glass
20. In use, the substantially flat outer and inner faces 132,
134 decrease distortion in comparison to the curved surface
of the remainder of the viewing portion 112 of the sight glass
20. Additionally, the substantially flat outer face 132 may aid
a user in applying a laser and/or light device to the sight
glass 20 and machine fluid 14 inside the sight glass 20.

Figure 6C:
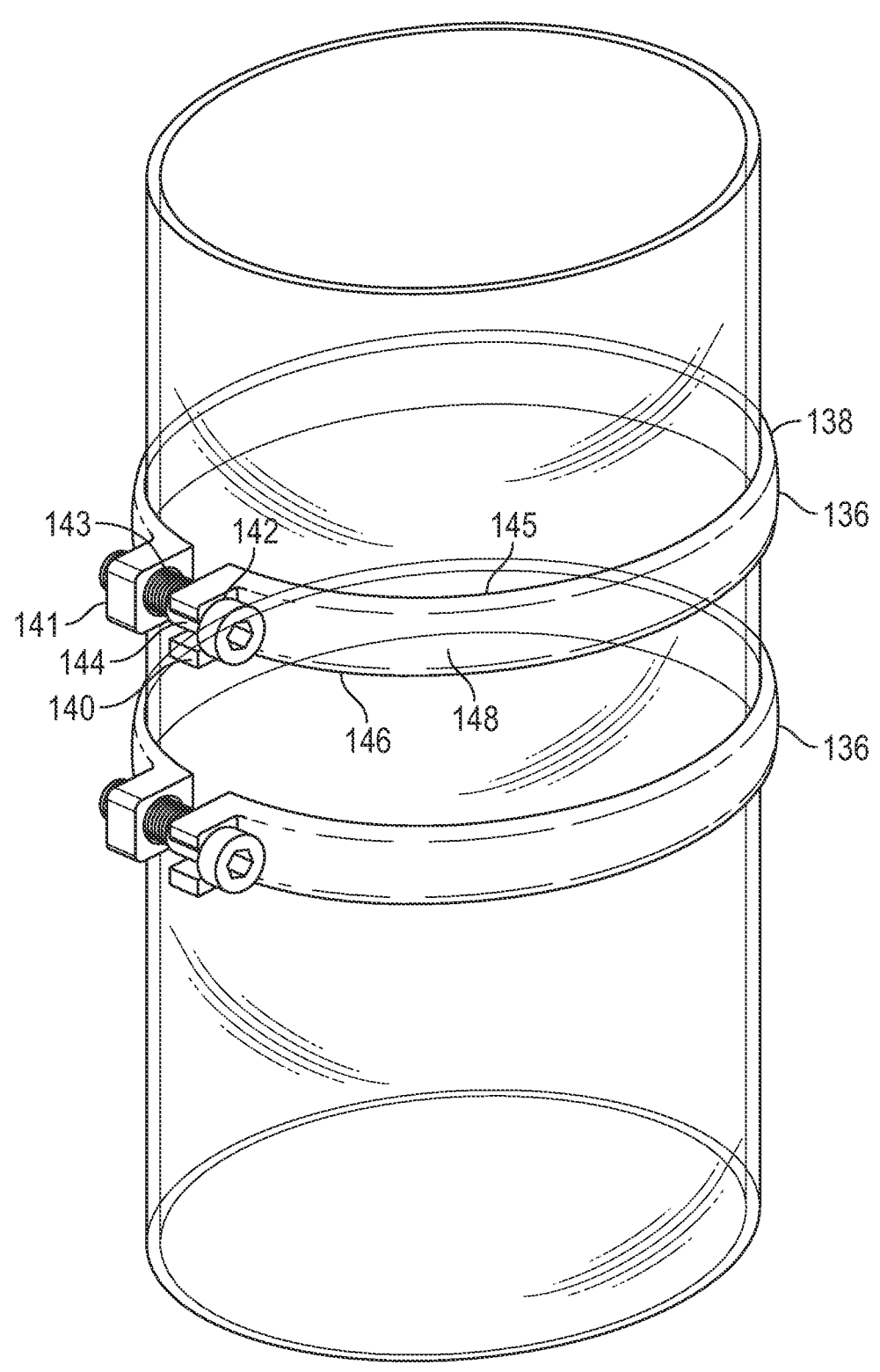
FIG. 6C is a perspective view of a portion of a sight glass column having a plurality of level rings constructed in accordance with the present disclosure.

Shown in FIG. 6*c* is a second embodiment of a set of level
rings 136 constructed in accordance with the present dis-
closure. In the present example, the set of level rings 136
includes two level rings, however it should be understood
that the set of level rings 136 can include one level ring 136,
or more than two level rings 136, e.g., 3, 4, or 5 level rings
136. Each of the level rings 136 may be identical in
construction and function with the exception that each level
ring 136 may be provided with a distinct color. The level
ring 136 is provided with a band 138 (having a generally
accurate shape) and a locking device 139. The band 138 is
provided with a first end 140 and a second end 141. The
band 138 may be sized and constructed to matingly and to
grippingly engage the sidewall 120 so as to permit a user to
move the locking device 139 to a first position in which the
band 138 may be selectively placed at a desired location on
the sidewall 120, and move the locking device 139 to a
second position in which the band 138 is maintained at the
desired location. In some embodiments, the locking device
139 engages the first end 140 and the second end 141 of the
band 138 and serves to set the positions of the first end 140
relative to the second end 141. For example, the locking
device 139 can be a screw having a head 142 engaging the first end 140 and a threaded shaft 143 positioned in and
engaging the second end 141. In this example, a portion of
the threaded shaft 143 extends between the first end 140 and
the second end 141.

Figure 6D:
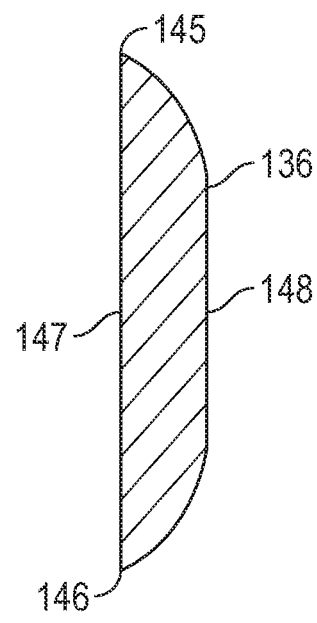
FIG. 6D is a cross-sectional view of a band of a level ring constructed in accordance with the present disclosure.

As shown in FIG. 6D, the band 138 has an upper edge
145, a lower edge 146, an inner surface 147, and an outer
surface 148, and wherein the outer surface 148 tapers
towards the inner surface 147 adjacent to the upper edge 145
and the lower edge 146 to make it harder for the band 138
to be gripped by a user. Tapering the outer surface 148 at the
upper edge 145 and the lower edge 146 also reduces the
occurrence of unintentional movement of the level ring 136
when the locking device 139 is in the second position, and
prevents debris from building up on the level ring 136 and
obstructing a view of the machine fluid 14. In some embodi-
ments, the inner surface 147 can have a planar cross-section
and be non-tapered to increase surface area contact with the
sight glass 20.

To facilitate the addition/removal of the level ring 136 to
the sidewall 120, the first end 140 may be provided with a
slot 144 having a width greater than a width of the threaded
shaft 143. To add the level ring 136 to the sidewall 120, the
screw is placed in the first position and then the band 138 is
wrapped around the sidewall 120 at the desired location. In
this position, the threaded shaft 143 is moved into the slot
144 and then moved to the second position so as to lock the
band 138 on to the sidewall 120 at the desired location. To
remove the level ring 136 from the sidewall 120, the screw
is placed in the first position to release tension within the
band 138, and then the threaded shaft 143 is moved out of
the slot 144. Once the threaded shaft 143 has been moved
out of the slot 144, the band 138 can be removed from the
sidewall 120. The band 138 can be constructed of any
suitable flexible material such as plastic or metal. Although
the locking device 139 has been shown and described by
way of example as the screw, it should be understood that the
locking device 139 can be constructed in other manners.

The remote sensing port 18 may be composed of the same
material as the surrounding material of the sight glass 20
and/or of one or more materials having optical properties
different than the surrounding material of the sight glass 20.
For example, the material of the remote sensing port 18 may
minimize distortion, minimize reflection, and/or magnify the
contents of the sight glass 20. The remote sensing port 18
may be used as a viewing window for a user to visually
examine the machine fluid 14 or other material in the sight
glass 20 with or without the use of an instrument, such as a
camera or photo-spectrometer. For example, the remote
sensing port 18 may be composed of material having optical
properties that allow a laser to pass through the remote
sensing port 18 with minimal distortion and reflection. The
laser may be used to measure properties of the fluid inside
the sight glass 20.

In one embodiment, the remote sensing port 18 may have
a shape conducive to magnification. In this instance, the
remote sensing port 18 may be provided with a convex outer
face (not shown) and a convex inner face (not shown) to
provide a substantially undistorted magnification of a user's
view of the machine fluid 14.

In one embodiment, the sight glass 20 may have at least
one remote sensing port 18 having a shape conducive to
magnification. In this instance, the remote sensing port 18
may be provided with a convex outer face (not shown) and
a convex inner face (not shown) to provide a substantially
undistorted magnification of a user's view of the machine
fluid 14 in the sight glass 20.

Figure 8A:
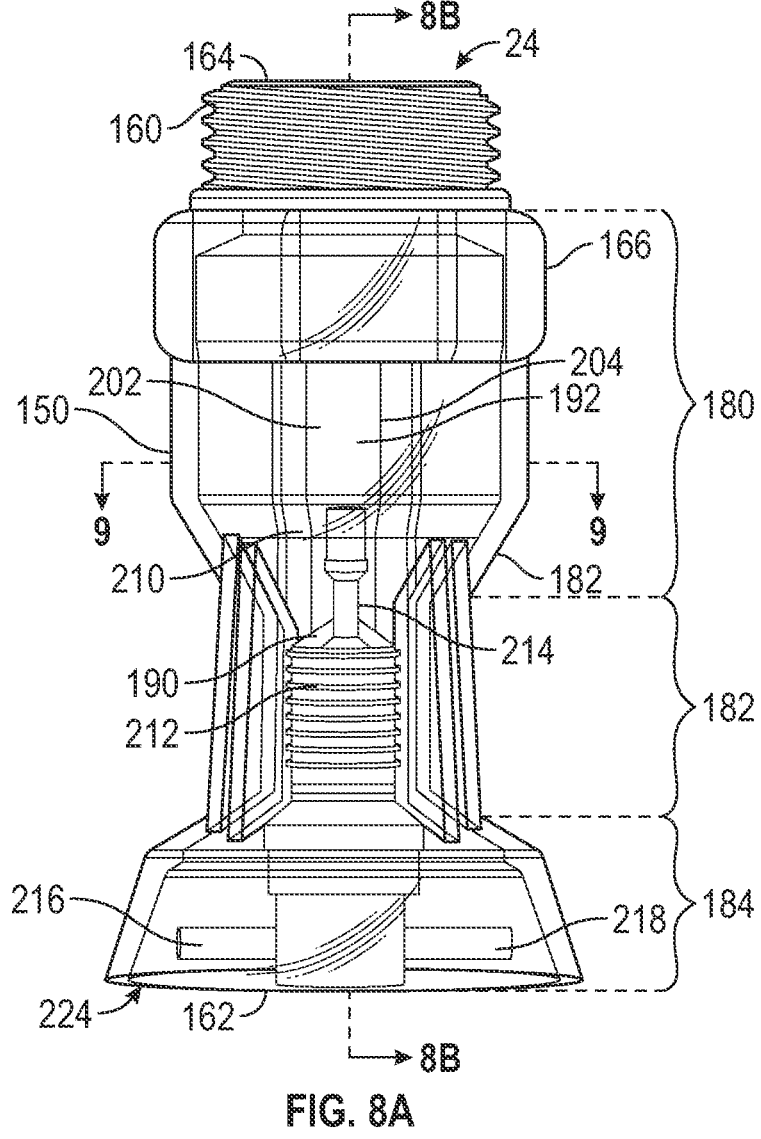
FIG. 8A is a front perspective view of an exemplary bottom sediment and water bowl in accordance with the present disclosure.
Figure 8B:
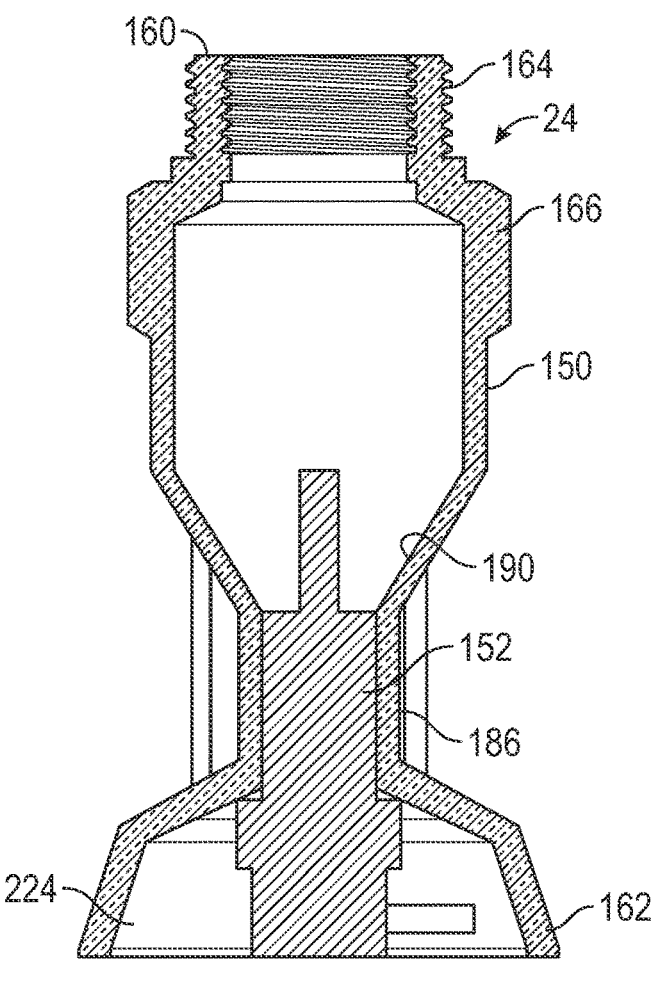
FIG. 8B is a cross-sectional view of a bowl member of the bottom sediment and water bowl of FIG. 8A taken along the lines 8B-8B thereof, and also a side-elevational view of a drain valve supported by the bowl member.
Figure 9:
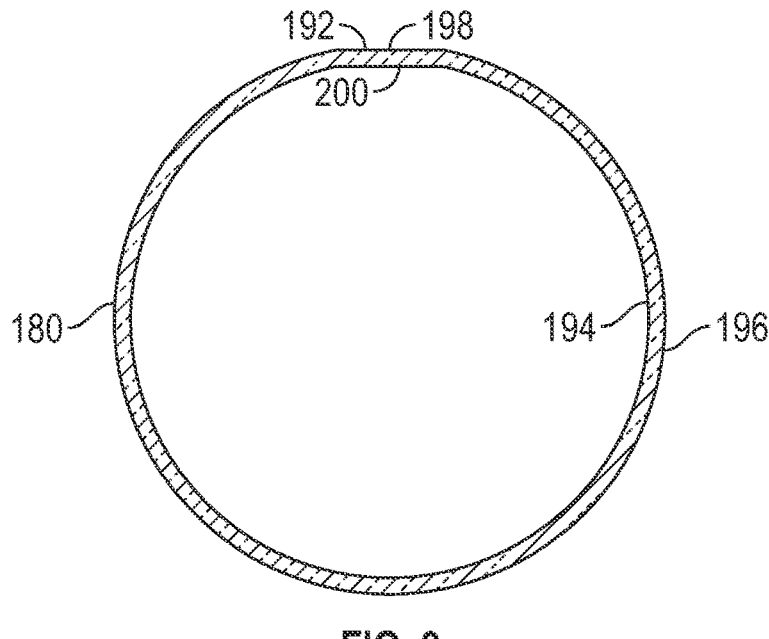
FIG. 9 is a cross-sectional view of the bowl member of the bottom sediment and water bowl of FIG. 8A taken along the lines 9-9 thereof.

FIG. 8A is a front perspective view of an exemplary embodiment of the bottom sediment and water bowl 24 in accordance with the present disclosure. The bottom sediment and water bowl 24 may be provided with a bowl member 150 and a drain valve 152. FIG. 8B is a cross-sectional view of the bowl member 150 of the bottom sediment and water bowl 24 of FIG. 8A taken along the lines 8B-8B thereof, and also a side-elevational view of the drain valve 152 supported by the bowl member 150. FIG. 9 is a cross-sectional view of the bowl member 150 of the bottom sediment and water bowl 24 of FIG. 8A taken along the lines 9-9 thereof.

The bowl member 150 may be in the form of a tube having an upper end 160, and a lower end 162. The bowl member 150 may be provided with a connector 164 located adjacent to the upper end 160, and a raised portion 166 positioned adjacent to the connector 164 so that the connector 164 is between the raised portion 166 and the upper end 160. The connector 164 may be provided with any configuration to connect to one of the ports 78 of the body 34. For example, the connector 164 may be externally threaded so as to matingly engage with internal threads of the port 78. In another embodiment, the connector 164 may be configured as a male part of a quick connect assembly. The raised portion 166 may be configured to facilitate installation of the bowl member 150 onto one of the ports 78 or other suitable device. In one embodiment, the raised portion 166 may be configured as a hex nut.

The bowl member 150 may have a bowl portion 180, a drain port 182 and a shield portion 184. The drain port 182 may be positioned between the bowl portion 180 and the shield portion 184. The drain port 182 is provided with an inner surface 186 that is sized and configured to receive and support the drain valve 152. For example, the drain port 182 may be provided with internal female threads. The bowl portion 180 may extend from the connector 164 to the drain port 182 and is sized and configured to receive a relatively small amount of machine fluid 14 for viewing and purging from the bowl portion 180. For example, the bowl portion 180 may hold approximately 1 ounce of machine fluid 14.

The bowl portion 180 may be provided with a bottom 190. In one embodiment, the bottom 190 may be provided with a funneled shape so as to direct the machine fluid 14 towards the drain port 182. When the bottom 190 is provided with the funneled shape, the bottom 190 purges water and sediments from the bowl portion 180 through the drain valve 152 in a more efficient manner than conventional bottom sediment and water bowls having a flat bottom. The funneled shape of the bottom 190 also permits easy viewing of stratified sediment to aid in condition monitoring.

The bowl portion 180 may also be provided with at least one remote sensing port 192. Shown in FIG. 9 is a cross-sectional view of the bowl portion 180 showing one manner of making the remote sensing port 192. The bowl portion 180 may have a tubular shape and have an inner surface 194 and an outer surface 196. The at least one remote sensing port 192 extends between the inner surface 194 and the outer surface 196. In the embodiment illustrated in FIGS. 8A, 8B and 9, the bowl portion 180 has one remote sensing port 192. Of course, it will be understood that the bowl portion 180 may have more than one remote sensing port 192, and that the remote sensing port(s) 192 may be located in different positions in the bowl portion 180.

The bowl portion 180 may have a cylindrical cross-section outside of the remote sensing port 192 as shown in FIG. 9. The remote sensing port 192 may have a substantially flat outer face 198 on the outer surface 196 and/or a substantially flat inner face 200 on the inner surface 194 of the bowl portion 180. In use, the substantially flat outer and inner faces 198, 200 decrease distortion in comparison to the curved surface of the bowl portion 180. Additionally, the substantially flat outer face 198 may aid a user in applying a laser and/or light device to the bowl portion 180 and machine fluid 14 inside the bowl portion 180.

The remote sensing port 192 may be composed of the same material as the surrounding material of the bowl portion 180 and/or of one or more materials having optical properties different than the surrounding material of the bowl portion 180. For example, the material of the remote sensing port 192 may minimize distortion, minimize reflection, and/or magnify the contents of the bowl portion 180. The remote sensing port 192 may be used as a viewing window for a user to visually examine the machine fluid 14 or other material in the bowl portion 180 with or without the use of an instrument, such as a camera or photo-spectrometer. For example, the remote sensing port 192 may be composed of material having optical properties that allow a laser to pass through the remote sensing port 192 with minimal distortion and reflection. The laser may be used to measure properties of the machine fluid 14 within the bowl portion 180.

In one embodiment, the bowl portion 180 may have at least one remote sensing port 192 having a shape conducive to magnification. In this instance, the remote sensing port 192 may be provided with a convex outer face (not shown) and a convex inner face (not shown) to provide a substantially undistorted magnification of a user's view of the machine fluid 14 in the bowl portion 180.

Referring again to FIG. 8A, the remote sensing port 192 may extend from the raised portion 166 to the bottom 190 and may have a first side 202 and a second side 204 which may have a linear configuration, although other configurations may be used as well.

The bottom sediment and water bowl 24, may also be provided with one or more indicator 210 suspended within the bowl portion 180 so as to provide information with respect to one or more contaminant or property of the machine fluid 14. For example, the indicator 210 may be a rare earth magnet (or other type of magnet) for collecting ferrous particles within the machine fluid 14. In another embodiment, the indicator 210 may be steel, which rusts in the presence of water. The one or more indicator 210 may be suspended in a range from about ⅛ inch to ¾ inch above the bottom of the bowl portion 180 depending upon the size of the bowl portion 180 and available space within the bowl portion 180. In one embodiment the one or more indicator 210 is suspended ¼ inch above the bottom 190.

The one or more indicator 210 may be suspended with any suitable assembly and may be supported by the bowl portion 180 and/or the drain valve 152. In the example shown, the drain valve 152 is provided with an upper tip 211, and the indicator 210 is connected to and extends from the upper tip 211. For example, as shown in FIG. 8A, the drain valve 152 may be provided with a drain body 212 having external threads threaded into the drain port 182 of the bowl member 150. The drain body 212 may have a flow channel (not shown) formed through a lower end thereof. The drain valve 152 The drain valve 152 may be connected to and support a support member 214. The support member 214 is connected to the indicator 210 and suspends the indicator 210 from the bottom 190.

The drain valve 152 may be externally threaded. As would be understood by one skilled in the art, this type of threaded drain valve may include a spring to maintain the drain valve in a closed position, and may be moved vertically against the force of the spring with a pair of arms 216 and 218 that are rotated.

The shield portion 184 extends below the drain port 182 and extends outwardly and downwardly from the drain port 182 so as to prevent inadvertent contact with the drain valve 152 and/or the arms 216 and 218 in a lateral direction. In one embodiment, the shield portion 184 has a continuous ring shape that defines an opening 224 that receives the drain valve 152 and faces downward in a vertical direction. To use the drain valve 152, a user would place their fingers within the opening 224, grip the arms 216 and 218 and then move the arms 216 and 218 to a desired position.

The bowl member 150 can be constructed of a material that is high impact, chemically resistant and transparent to light in the visible region. In one embodiment, the bowl member 150 is integrally formed as a unitary structure using a molding process. In this instance, the connector 164, the raised portion 166, the remote sensing port 192, the bowl portion 180, drain port 182, and the shield portion 184 may be molded features of the sight glass 20.

Figure 10:
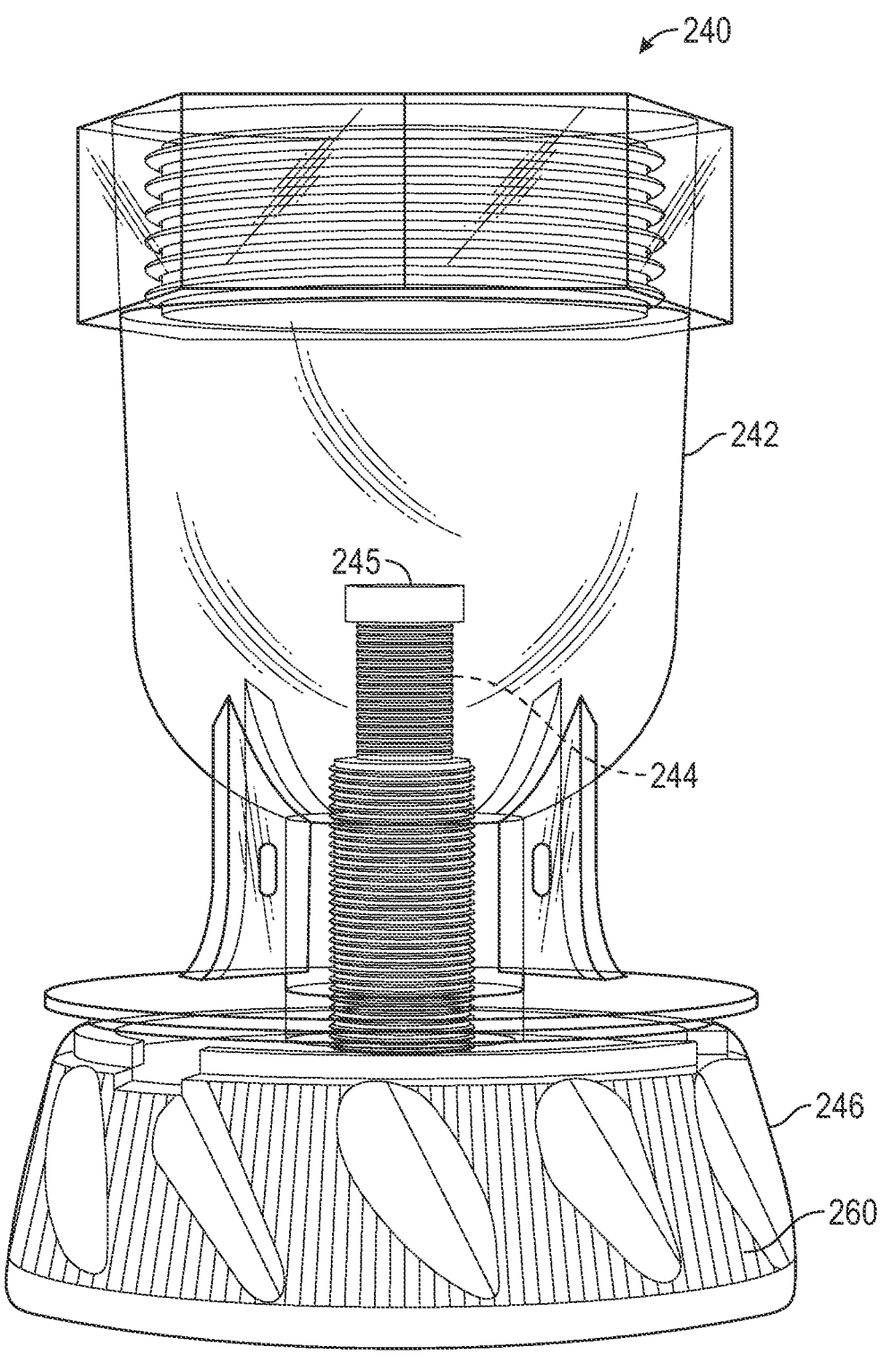
FIG. 10 is a side elevational view of another embodiment of a bottom sediment and water bowl constructed in accordance with the present disclosure.
Figure 11:
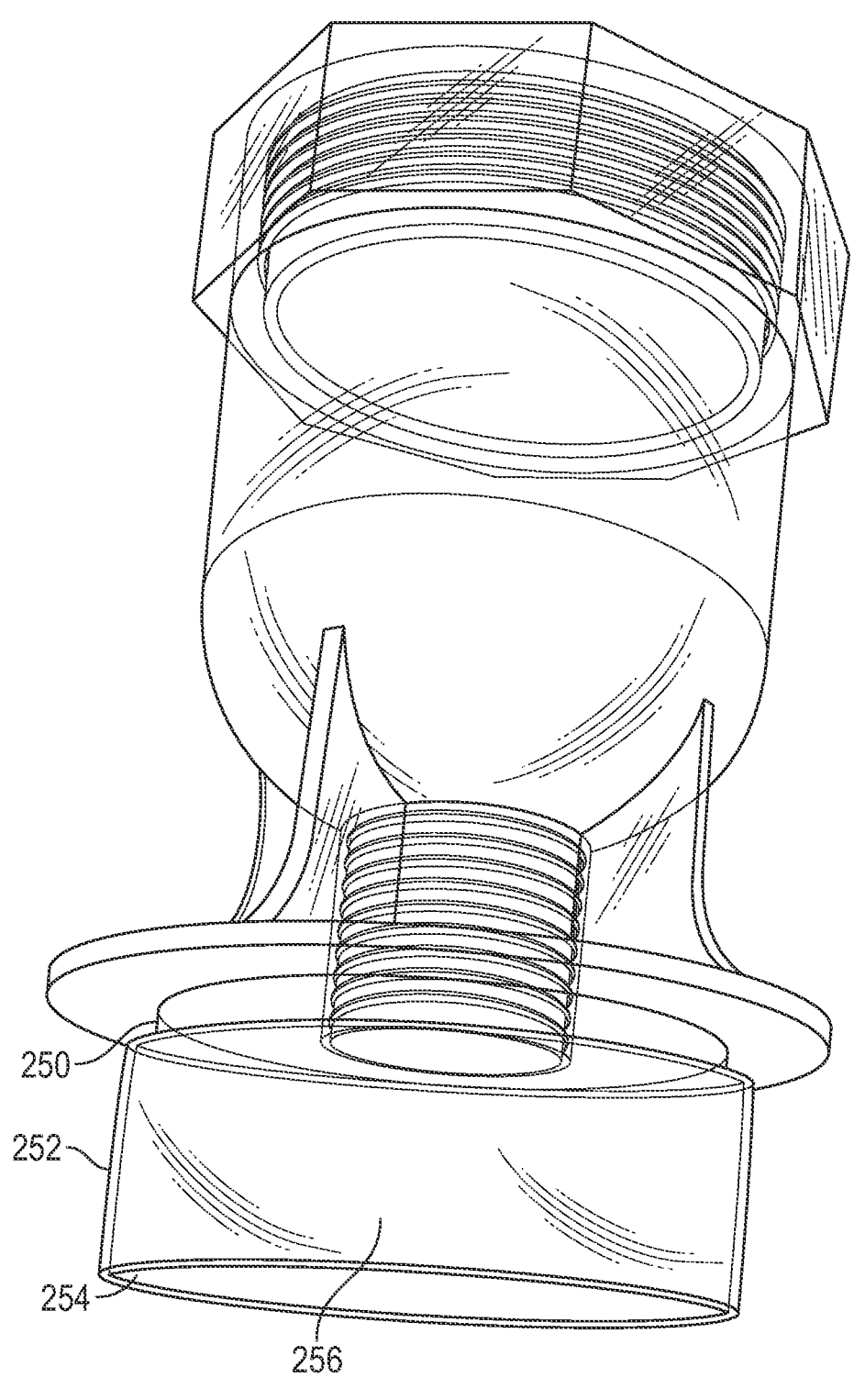
FIG. 11 is a perspective view of a bowl member of the bottom sediment and water bowl of FIG. 10.
Figure 12:
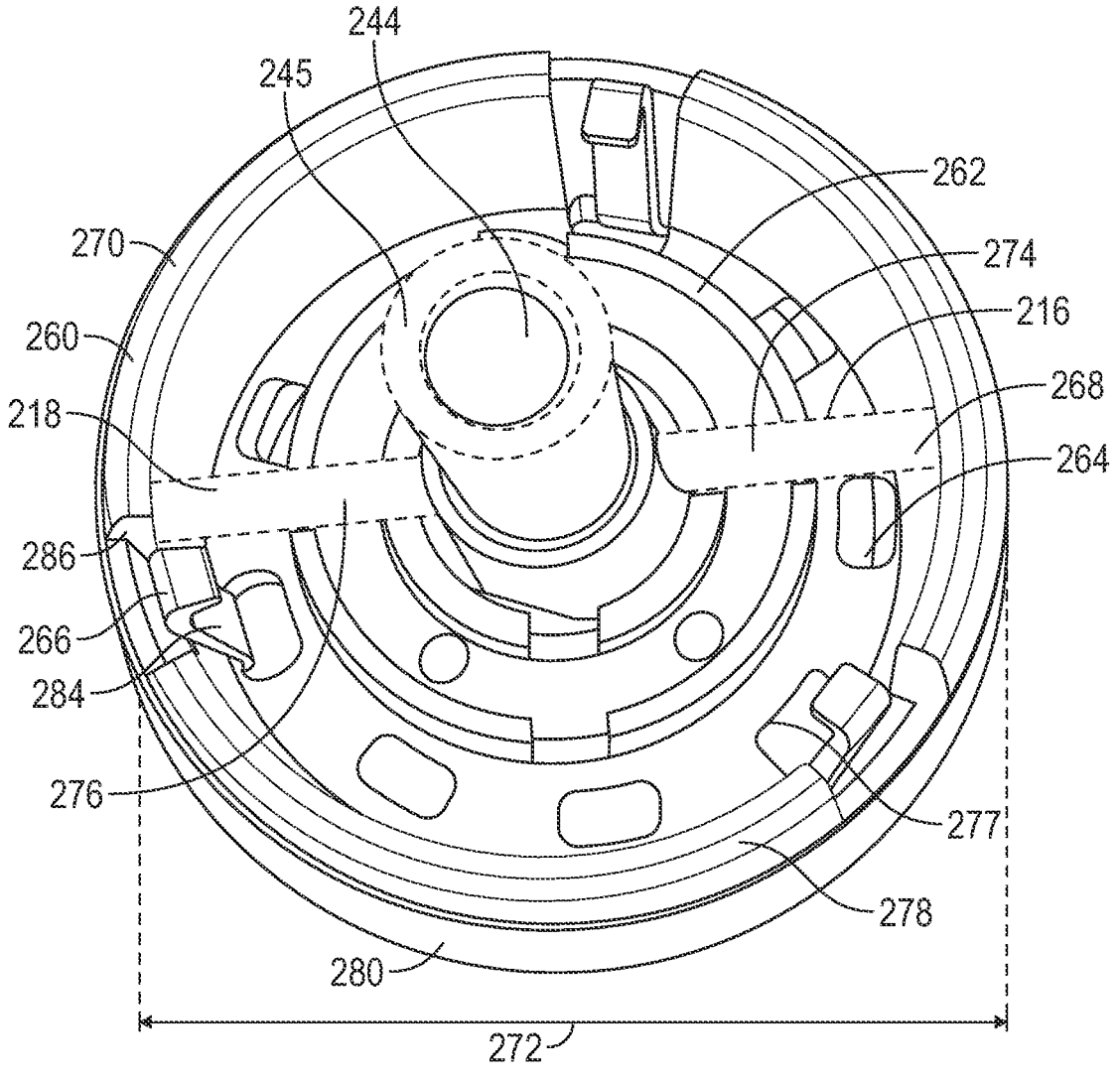
FIG. 12 is a top plan view of a knob constructed in accordance with the present disclosure.

Shown in FIG. 10 is another embodiment of a bottom sediment and water bowl 240 in accordance with the present disclosure. The bottom sediment and water bowl 240 may be provided with a bowl member 242, a drain valve 244, and an indicator 245. The bottom sediment and water bowl 240 is also provided with a knob 246 extending external to the bowl member 242 and configured to be gripped by a user to facilitate the user opening and/or closing the drain valve 244. The bowl member 242 can be identical in construction and function as the bowl member 150 described above, except that the bowl member 242 is provided with a channel 250 (see FIG. 11) formed within an outer surface 252 and/or an inner surface 254 of a shield portion 256 so as to engage and maintain the knob 246 on the shield portion 256. In some embodiments, the channel 250 extends in a horizontal plane circumferentially around the shield portion 256. In other embodiments, the channel 250 may only extend about a portion of the circumference of the shield portion 256.

The drain valve 244 can be identical in construction and function as the drain valve 152. The indicator 245 can be located at and supported by an upper tip of the drain valve 244 and can be constructed in an identical manner as the indicator 210 discussed above.

The knob 246 is provided with a first gripping portion 260, a second gripping portion 262, at least one connecting member 264 connecting the first gripping portion 260 to the second gripping portion 262, and at least one connector 266 for connecting the knob 246 to the shield portion 256. The first gripping portion 260 is spaced a distance away from the second gripping portion 262 such that a circular channel 268 extends between the first gripping portion 260 and the second gripping portion 262. The circular channel 268 is sized to receive the shield portion 256. The first gripping portion 260 is configured to be gripped by a user, and the second gripping portion 262 is configured to grip the arms 216 and 218 of the drain valve 244. The connecting member 264 rigidly connects the first gripping portion 260 to the second gripping portion 262 such that force applied to the first gripping portion 260 is translated to the second gripping portion 262 thereby permitting a user to open or close the drain valve 244 by gripping and moving the first gripping portion 260.

In the embodiment shown, the first gripping portion 260 includes a ring 270 having a first diameter 272. The second gripping portion 262 is positioned within the confines of the ring 270, and defines at least two channels, e.g., a first channel 274 and a second channel 276. The first channel 274 is sized to receive the arm 216 and the second channel 276 is sized to receive the arm 218. In one embodiment, the second gripping portion 262 includes a plurality of arcuately shaped segments 277 that are connected to and extend from the connecting member 264. In the example shown, four arcuately shaped segments 277 form a first segmented ring 278, and four of the arcuately shaped segments 277 form a second segmented ring 280. The first segmented ring 278, the second segmented ring 280 and the first gripping portion 260 can be concentrically positioned.

The at least one connector 266 can include a plurality of connectors 266. In the example shown, the knob 246 is provided with three connectors 266 positioned angularly equidistant on the first gripping portion 260. Although three connectors 266 are shown and described herein, it should be understood that more or less connectors 266 can be provided. In one embodiment, the connectors 266 are provided with a biasing member 284 and a prong 286. The biasing member 284 can be connected to the first gripping portion 260, the second gripping portion 262 or the connecting member 264. In the example shown, the biasing member 284 is connected to the first gripping portion 260 and extends orthogonally relative to the connecting member 264 and into the circular channel 268. The biasing member 284 can be constructed of any suitable material, such as a flexible metal or plastic material. In one embodiment, the knob 246 is a unitary structure formed of a molded plastic material, such as polycarbonate. It should be understood that in some embodiments the knob 246 may be made of separately formed pieces that are connected together.

The foregoing description provides illustration and description, but is not intended to be exhaustive or to limit the inventive concepts to the precise form disclosed. Modifications and variations are possible in light of the above teachings or may be acquired from practice of the methodologies set forth in the present disclosure.

Even though particular combinations of features are recited in the claims and/or disclosed in the specification, these combinations are not intended to limit the disclosure. In fact, many of these features may be combined in ways not specifically recited in the claims and/or disclosed in the specification. Although each dependent claim listed below may directly depend on only one other claim, the disclosure includes each dependent claim in combination with every other claim in the claim set.

No element, act, or instruction used in the present application should be construed as critical or essential to the invention unless explicitly described as such outside of the preferred embodiment. Further, the phrase "based on" is intended to mean "based, at least in part, on" unless explicitly stated otherwise.

What is claimed is:

1. A bottom sediment and water bowl for machine fluid monitoring, comprising:

a bowl member in a form of a tube having an upper end, a lower end and a connector located adjacent to the upper end, the bowl member having a bowl portion and a drain port portion with the drain port portion below the bowl portion, the drain port portion having an opening extending through the drain port portion from the lower end to the bowl portion;

a drain valve positioned within the opening of the drain port portion of the bowl member, the drain valve having an arm configured to adjust the drain valve, the arm extending outwardly from the drain valve a first predetermined distance; and a shield portion extending outwardly from the drain port portion a second predetermined distance greater than the first predetermined distance, the shield portion having a continuous ring shape and spaced apart from the arm to form a gap between the shield portion and the arm of the drain valve to provide access to the arm of the drain valve.

2. The bottom sediment and water bowl of claim 1, wherein the arm configured to adjust the drain valve includes a pair of arms.

3. The bottom sediment and water bowl of claim 1, wherein the bowl portion includes a bottom having a funneled shape whereby the bottom directs machine fluid within the bowl portion towards the drain valve portion.

4. The bottom sediment and water bowl of claim 1, further comprising a raised portion adjacent to the connector, the raised portion configured as a hex nut.

5. The bottom sediment and water bowl of claim 1, wherein the connector is externally threaded, or configured as a male portion of a quick connect assembly.

6. The bottom sediment and water bowl of claim 1, wherein the bowl portion is configured to hold 1 ounce of machine fluid.

7. The bottom sediment and water bowl of claim 1, wherein the bowl member is constructed of a material that is impact resistant.

8. The bottom sediment and water bowl of claim 1, wherein the bowl member is constructed of a material that is transparent to light in a visible region.

9. The bottom sediment and water bowl of claim 1, wherein the opening that receives the drain valve faces downward in a vertical direction.

10. The bottom sediment and water bowl of claim 9, wherein the drain valve portion is internally threaded around the opening, and wherein the drain valve is externally threaded.

11. A bottom sediment and water bowl for machine fluid monitoring, comprising:

a bowl member in a form of a tube having an upper end and a connector located adjacent to the upper end, the bowl member having a bowl portion and a drain port with the drain port below the bowl portion; and a drain valve connected to the drain port of the bowl member, the drain valve having an arm configured to adjust the drain valve;

wherein the bowl member further comprises a shield portion having an opening that receives the drain valve, the shield portion extending outwardly from the drain port and having a continuous ring shape; and wherein the bowl portion comprises at least one remote sensing port between an inside surface and an outside surface, the remote sensing port being shaped to provide optical properties different from a portion of the bowl portion bordering the remote sensing port.

12. The bottom sediment and water bowl of claim 11, wherein the outside surface of the bowl portion comprising the at least one remote sensing port is flat.

13. The bottom sediment and water bowl of claim 11, wherein the inside surface of the bowl portion comprising the at least one remote sensing port is flat.

14. The bottom sediment and water bowl of claim 11, wherein the optical properties of the remote sensing port are configured to magnify contents of the bottom sediment and water bowl.

* * * * *